US012375434B2

(12) United States Patent
Nassi

(10) Patent No.: US 12,375,434 B2
(45) Date of Patent: Jul. 29, 2025

(54) METHOD AND SYSTEM FOR PROVIDING MESSAGES IN GRAPHICS

(71) Applicant: Lior Nassi, Herzlia (IL)

(72) Inventor: Lior Nassi, Herzlia (IL)

( * ) Notice: Subject to any disclaimer, the term of this patent is extended or adjusted under 35 U.S.C. 154(b) by 859 days.

(21) Appl. No.: 15/540,619

(22) PCT Filed: Dec. 30, 2015

(86) PCT No.: PCT/IB2015/060060
§ 371 (c)(1),
(2) Date: Jun. 29, 2017

(87) PCT Pub. No.: WO2016/108203
PCT Pub. Date: Jul. 7, 2016

(65) Prior Publication Data
US 2018/0006981 A1    Jan. 4, 2018

Related U.S. Application Data

(60) Provisional application No. 62/098,420, filed on Dec. 31, 2014.

(51) Int. Cl.
*G06F 13/00* (2006.01)
*G06Q 10/107* (2023.01)
*H04L 51/046* (2022.01)
*H04L 51/10* (2022.01)
*H04L 51/18* (2022.01)
*H04M 1/72436* (2021.01)

(52) U.S. Cl.
CPC ........... *H04L 51/10* (2013.01); *G06Q 10/107* (2013.01); *H04L 51/046* (2013.01); *H04L 51/18* (2013.01); *H04M 1/72436* (2021.01)

(58) Field of Classification Search
CPC ....... H04L 51/18; H04L 51/046; H04L 51/10; H04L 29/06; H04L 51/04; H04L 51/00; H04L 12/1813; G06Q 10/107; H04M 1/72552; H04M 1/72436
USPC ......... 709/204–207, 236, 246; 715/751–759, 715/727
See application file for complete search history.

(56) References Cited

U.S. PATENT DOCUMENTS

| | | | |
|---|---|---|---|
| 8,170,872 B2* | 5/2012 | Lyle | |
| 8,893,022 B2* | 11/2014 | Akram | H04N 21/234318 709/231 |
| 10,346,878 B1* | 7/2019 | Ostermann | G06Q 30/0277 |
| 10,587,541 B2* | 3/2020 | Hum | H04L 51/046 |
| 10,685,186 B2* | 6/2020 | Gu | G06F 40/35 |
| 2005/0160149 A1 | 7/2005 | Durand et al. | |
| 2006/0075054 A1* | 4/2006 | Zhang | H04L 51/04 709/206 |
| 2009/0144366 A1* | 6/2009 | Lyle | |
| 2011/0246908 A1* | 10/2011 | Akram | H04N 21/234318 715/752 |
| 2014/0164117 A1 | 6/2014 | Haines | |

(Continued)

OTHER PUBLICATIONS

Error Code 401 [blog name], "Store your message inside Image," The Wayback Machine.*

*Primary Examiner* — Kenneth R Coulter
(74) *Attorney, Agent, or Firm* — Patshegen IP; Moshe Pinchas

(57) ABSTRACT

Methods and systems that allow entities to package messages, such as those for texting sessions on mobile devices, such as smart phones, in graphics, such as emoticons.

26 Claims, 18 Drawing Sheets

(56) References Cited

U.S. PATENT DOCUMENTS

| | | | |
|---|---|---|---|
| 2016/0156574 A1* | 6/2016 | Hum | G06Q 20/10 |
| | | | 715/752 |
| 2016/0156584 A1* | 6/2016 | Hum | H04L 51/32 |
| | | | 715/752 |
| 2017/0052946 A1* | 2/2017 | Gu | H04L 51/046 |

* cited by examiner

METHOD AND SYSTEM FOR PROVIDING MESSAGES IN GRAPHICS

CROSS REFERENCES TO RELATED APPLICATIONS

This application is related to and claims priority from commonly owned US Provisional Patent Application Ser. No. 62/098,420, entitled: METHOD AND SYSTEM FOR PROVIDING MESSAGES IN GRAPHICS, filed on Dec. 31, 2014, the disclosure of which is incorporated by reference in its entirety herein.

TECHNICAL FIELD

The present invention relates to methods and systems for providing messages transmitted over networks.

BACKGROUND

Text messaging is presently a popular mode of communication. Mobile phone users typically respond to and send numerous text messages each day.

SUMMARY OF THE INVENTION

The present invention includes embodiments that are directed to methods and systems for creating text and other electronic messages, electronic communications and the like, with unique messages, packaging these unique messages in graphics such as emoticons. These messages are for texting and messaging systems, such as SMS, WhatsApp™ and the like.

The present invention provides methods and systems for packaging messages, in audible forms, such as voice and sounds, visual forms, such as text and graphics, and video (with and without sound), as well as combinations thereof, into graphics, such as emoticons, for transmission over a communications network, from a computerized device, such as a smart phone, associated with a sender, to a computerized device, such as a smart phone, associated with a recipient, in and/or as electronic communications, including electronic messages. The communications network includes one or more networks, such as the Internet and other wide area and public networks, and cellular networks.

Embodiments of the invention are directed to a computerized, otherwise computer-implemented, method, for electronic messaging over a communications network, e.g., one or more networks, such as the Internet and other wide area and public networks, and cellular networks. The method comprises: obtaining at least one message in electronic form; obtaining a graphic in electronic form; and, packaging the at least one message with the graphic for transmission in an electronic communication to a destination over the communications network, such that when the electronic communication has been received at the destination, and the graphic is activated, the at least one message is presented.

Optionally, computerized method additionally comprises: transmitting the electronic communication to the destination over the communications network.

Optionally, the destination includes at least one of: a computerized device, and, a computer along the communications network.

Optionally, the at least one message is selected from the group consisting of voice, sound, text, graphics, video, and combinations thereof.

Optionally, the at least one message includes: a primary message includes at least one of: voice, sound, text, graphics, video, and combinations thereof; and, a secondary message.

Optionally, the secondary message includes audible sounds.

Optionally, the graphic includes at least one emoticon.

Optionally, the at least one message is presented as at least one of: a visible display, a graphic, sound, and video.

Optionally, the graphic is obtained in response to a selection from a user associated with the sending of an electronic message.

Optionally, the graphic is obtained in response to a computer selection of the graphic.

Optionally, the computer selection of the graphic is based on at least one of: the content of the message, data associated with the sender of the electronic message, and, data associated with the recipient of the electronic message.

Optionally, the obtaining the at least one message in electronic form, the obtaining the graphic in electronic form; and, the packaging the at least one message with the graphic for transmission as an electronic communication to a destination over the communications network, are performed by a processor.

Optionally, the electronic communication includes at least one of: e-mails, texts, SMS (short message service) messages, MMS (multimedia messaging service) messages, WhatsApp™ messages, Instant Messenger (IM) messages, and Twitter™ messages.

Embodiments of the invention are directed to a computerized system for electronic messaging over a communications network. The system comprises: a storage medium for storing computer components; and, a computerized processor for executing the computer components. The computer components comprise: a first computer module for obtaining at least one message in electronic form; a second computer module for obtaining a graphic in electronic form; and, a third computer module for packaging the at least one message with the graphic for transmission in an electronic communication to a destination over the communications network, such that when the electronic communication has been received at the destination, and the graphic is activated, the at least one message is presented.

Optionally, the second computer module for obtaining the graphic is configured for obtaining the graphic including at least one emoticon.

Optionally, the second computer module is additionally configured for receiving the graphic, as input in response to being selected by a user associated with the sender of the electronic message.

Optionally, the second computer module is additionally configured for selecting the graphic.

Optionally, the computerized system additionally comprises: a fourth computer module for transmitting the electronic communication including the graphic and the at least one message from a computerized device associated with a sender of the electronic communication, to a computerized destination associated with a recipient of the electronic communication, over the communications network.

Embodiments of the invention are directed to a computer usable non-transitory storage medium having a computer program embodied thereon for causing a suitable programmed system to create and prepare for transmission electronic communications, over a communications network, by performing the following steps when such program is executed on the system. The steps comprise: obtaining at least one message in electronic form; obtaining a graphic in electronic form; and, packaging the at least one message with the graphic for transmission in an electronic communication to a destination over the communications network, such that when the electronic communication has been received at the destination, and the graphic is activated, the at least one message is presented.

Optionally, the step of obtaining the graphic includes obtaining at least one emoticon in electronic form.

Optionally, the step of obtaining the graphic includes receiving the graphic as input, in response to the graphic being selected by a user associated with the sender of the electronic communication.

Optionally, the step of obtaining the graphic includes receiving the graphic as selected by a computerized process.

Optionally, selection of the graphic of the computerized process is performed based on at least one of: the content of the at least one message, and data associated with the sender of the electronic communication, and, data associated with the recipient of the electronic communication.

Optionally, the computer usable non-transitory storage medium additionally performs the step of: transmitting the electronic communication including the graphic and the at least one message from a computerized device associated with a sender of the electronic communication, to a computerized destination associated with a recipient of the electronic communication, over the communications network.

Optionally, the computer usable non-transitory storage medium additionally performs the step of: transmitting the electronic communication including the graphic and the at least one message from a computerized device associated with a sender of the electronic communication, to a computerized device associated with a recipient of the electronic communication, over the communications network.

This document references terms that are used consistently or interchangeably herein. These terms, including variations thereof, are as follows.

The terms "click", "clicks", "click on", "clicks on", "activates", and "activation", involves the activation of a computer pointing apparatus, such as a device commonly known as a mouse, or a touch, swipe, contact, or the like on a touch screen, on a location on a computer screen display, including screen displays of tablets and mobile telephones. The screen displays are activatable, for example, by an activatable icon, that causes an action of the various software and or hardware, including that for executing applications and supporting the computer screen display.

Throughout this document, a "web site" is a related collection of World Wide Web (WWW) files that includes a beginning file or "web page" called a home page, and typically, additional files or "web pages." The term "web site" is used collectively to include "web site" and "web page(s)."

A uniform resource locator (URL) is the unique address for a file, such as a web site or a web page, that is accessible over Networks including the Internet.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A server is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

A "client" is an application that runs on a computer, workstation or the like and relies on a server to perform some of its operations or functionality.

"n" and "nth" refer to the last member of a varying or potentially infinite series.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 4B-1, 4B-2 and 4B-3, collectively known as FIG. 4B are a flow diagram of alternate process to the process of FIG. 4A, with FIG. 4B-3 showing an exemplary subprocess for a subprocess of the flow diagram of FIGS. 4B-1 and 4B-2;

FIGS. 4D-1, 4D-2 and 4D-3, collectively known as FIG. 4D are a flow diagram of an alternative process to the process of FIG. 4B (FIGS. 4B-1, 4B-2, 4B-3), with FIG. 4D-3 showing an exemplary subprocess for a subprocess of the flow diagram of FIGS. 4D-1 and 4D-2.

DETAILED DESCRIPTION OF THE DRAWINGS

Figure 1A:
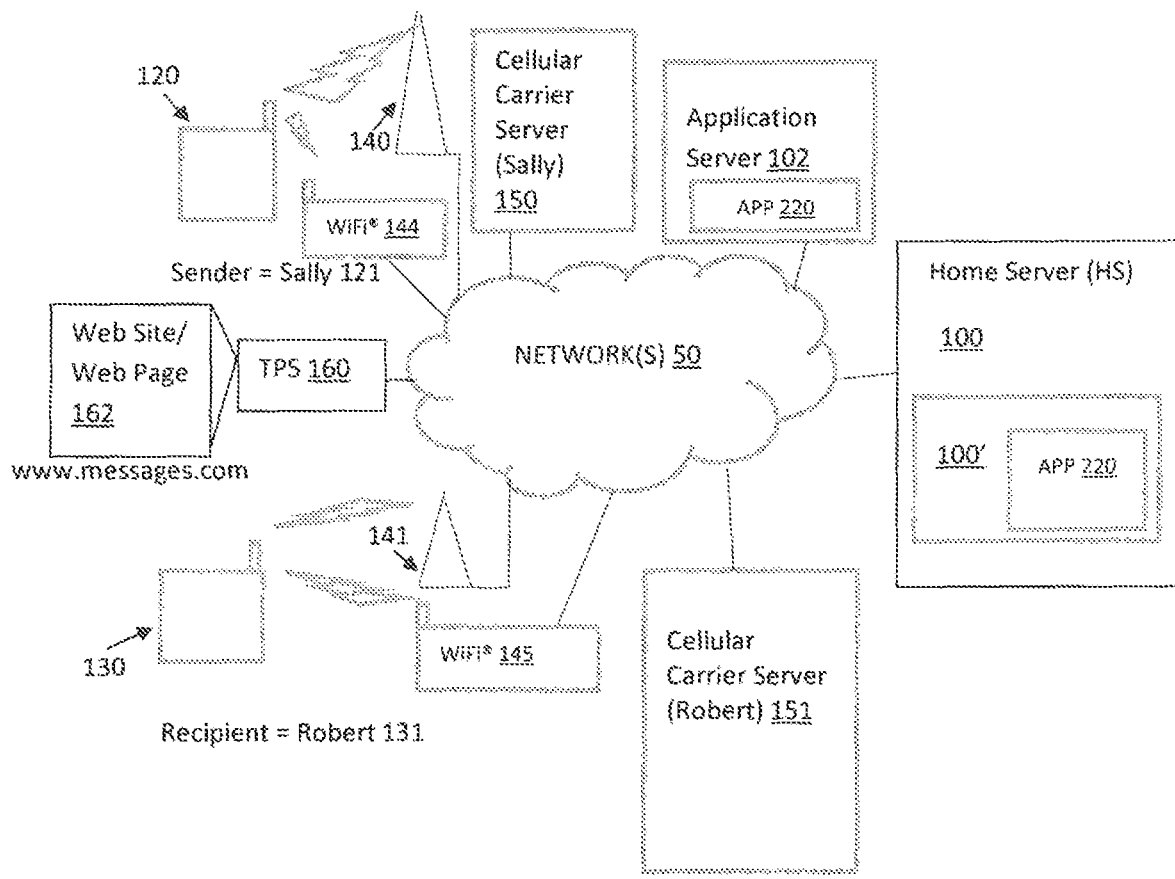
FIGS. 1A and 1B are diagrams of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

The present invention provides methods and systems for packaging messages, in audible forms, such as voice and sounds, visual forms, such as text and graphics, and video (with and without sound), as well as combinations thereof, into one or more graphics, such as emoticons, for transmission over a communications network, from, for example, a computerized device, such as a smart phone, associated with a sender, to, for example, a computerized device, such as a smart phone, associated with a recipient, in and/or as electronic communications, including electronic messages. When the electronic communication has been received at the destination, for example, the device associated with the recipient, and the graphic, e.g., emoticon, is activated, by a contact, touch, swipe or the like on the touch screen of the device, or mouse click or other activation on a computer monitor, the at least one message is presented. The electronic communications, including electronic messages, are, for example, in the form of e-mails, texts, SMS (short message service) messages, MMS (multimedia messaging service) messages, WhatsApp™ messages, Instant Messenger (IM) messages, including those of ICQ™, Twitter™ messages (commonly known as tweets), and the like. The communications network includes one or more networks, such as the Internet and other wide area and public networks, and cellular networks.

Figure 1B:
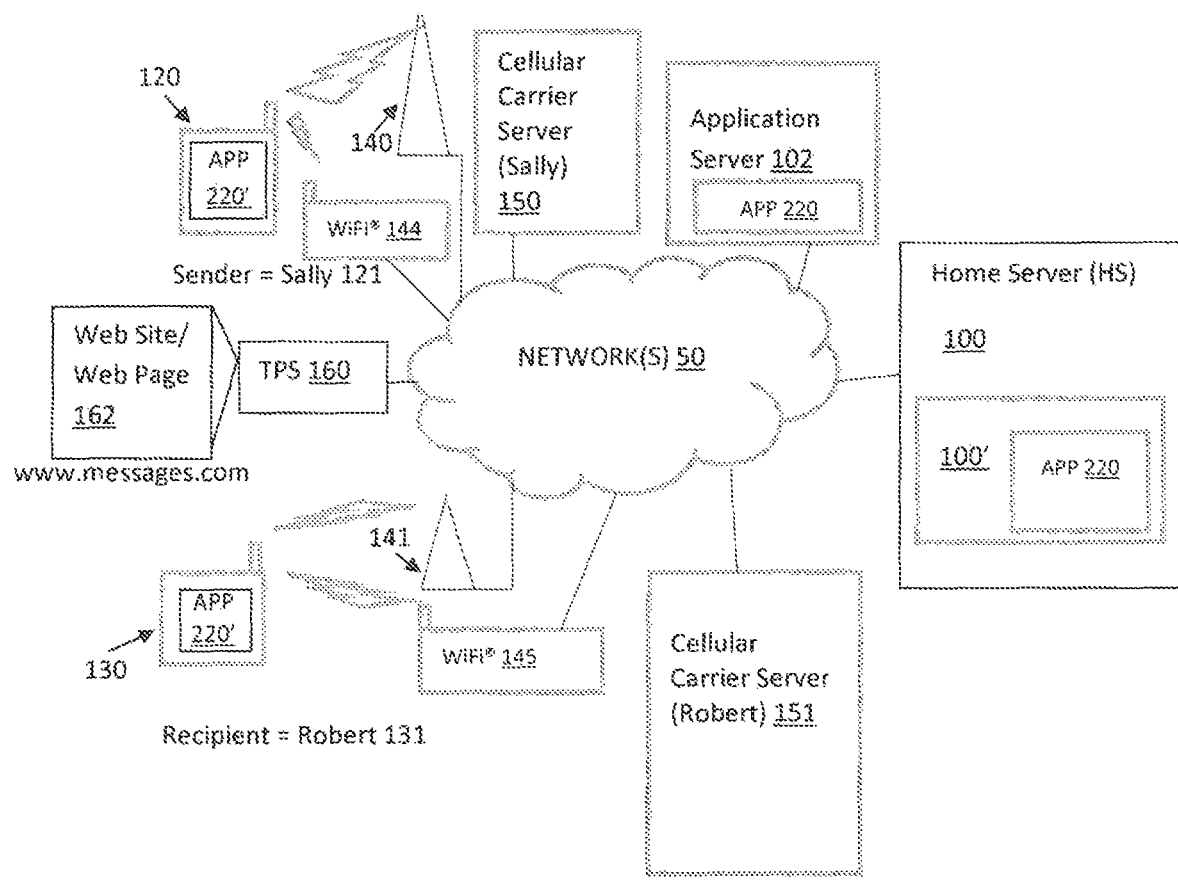
Figure 8:
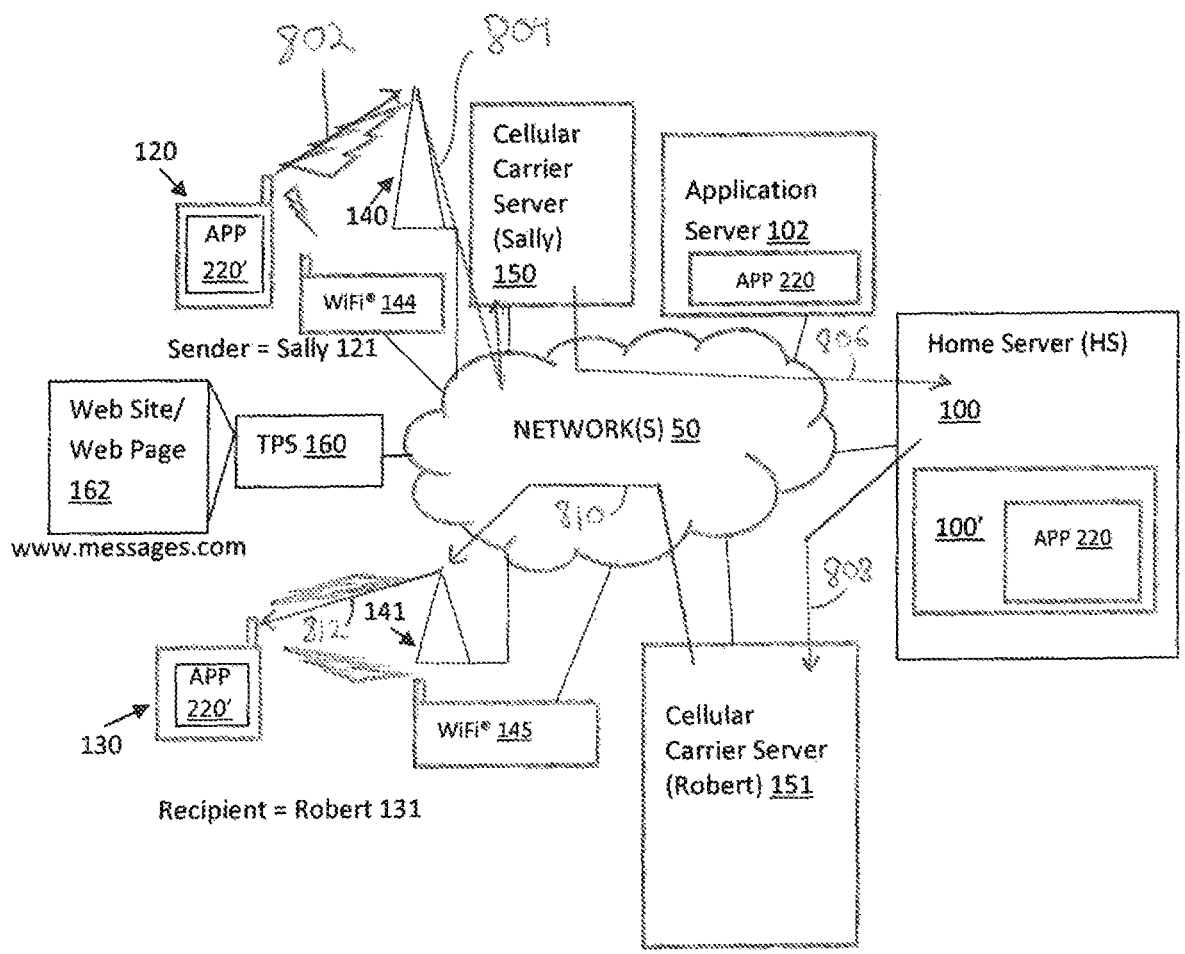

Reference is now made to FIG. 1A, which shows an exemplary operating environment, including a network 50, to which is linked a home server (HS) 100, also known as a main server. The home server 100 also defines a system 100', either alone or with other, computers, including servers, components, and applications, e.g., client applications, associated with either the home server 100, as detailed below. The network 50 is, for example, a communications network, such as a Local Area Network (LAN), or a Wide Area Network (WAN), including public networks such as the Internet. As shown in FIGS. 1A, 1B and 8, the network 50 is either a single network or a combination of networks and/or multiple networks, including also (in addition to the aforementioned communications networks such as the Internet), for example, cellular networks. "Linked" as used herein includes both wired or wireless links, either direct or indirect, and placing the computers, including, servers, components and the like, in electronic and/or data communications with each other.

The various servers linked to the network 50, include, for example, an application server 102, which stores and makes accessible, for example, by downloading, the application 220 of the present invention. This application 220 may be obtained by entities, represented for example, by computers 120, 130 of the corresponding users, Sally 121 and Robert 131. The application 220 includes executable software, and graphical user interfaces (GUI), through which the messaging functionalities of the invention are implemented. The application 220 includes code segments which map to the system 100' of the home server 100, for allowing user computer/user computerized device interaction with the system 100'. There are also code segments, including self-executing instructions, for performing functions such as packaging messages, e.g., secondary messages, into the selected emoticons/graphics, and the like.

There are also additional servers 150, 151 associated with the mobile carriers and mobile networks, networks to which the respective computers 120, 130, of the corresponding users 121, 131, are linked. The linkage to these servers 150, 151 is, for example by cellular signals (e.g., GPRS (General Packet Radio Service) and the like) to cellular towers 140, 141, or through WiFi® hot spots (e.g., transmitters) 144, 145. These servers 150, 151 include functionalities for handling the messaging for the various user computers, for example, the smart phone 120 of user (sender) Sally 121 and the smart phone 130 of user (recipient) Robert 131, linked to the network 50.

There are also additional servers, represented by server 160, which host web sites/web pages 162, where users and recipients can go to see and receive their respective messages. This web site has, for example, a URL of www.messages.com.

FIG. 1B shows the system of the invention ready for messaging sessions in accordance with the invention, as both Sally 121 and Robert have downloaded and installed, or otherwise installed the application 220' on their respective computers 120, 130 (e.g., smart phones), such that the application 220' is now active or running on the smart phones 120, 130. The application 220 is such that it embeds or integrates with the hardware and software, e.g., code, of the respective user computers 120, 130. The now downloaded application 220' operates, for example, as a client, and the respective user computers 120, 130 are, for example, operating as client computers. The client, in some cases, is part of the system 100'.

The home server (HS) 100 is of an architecture that includes one or more components, engines, modules and the like, for providing numerous additional server functions and operations, and, for running the processes of the system 100' of the invention (if the home server 100 is accessed directly, or associated with the application 220, which maps to the home server 100, upon its being downloaded or otherwise obtained and installed, for example on each user computer 120, 130. The home server (HS) 100 may be associated with additional storage, memory, caches and databases, both internal and external thereto. For explanation purposes, the home server (HS) 100 may have a uniform resource locator (URL) of, for example, www.hs.com. While a single home server (HS) 100 is shown, the home server (HS) 100 may be formed of multiple servers and/or components.

Figure 2:
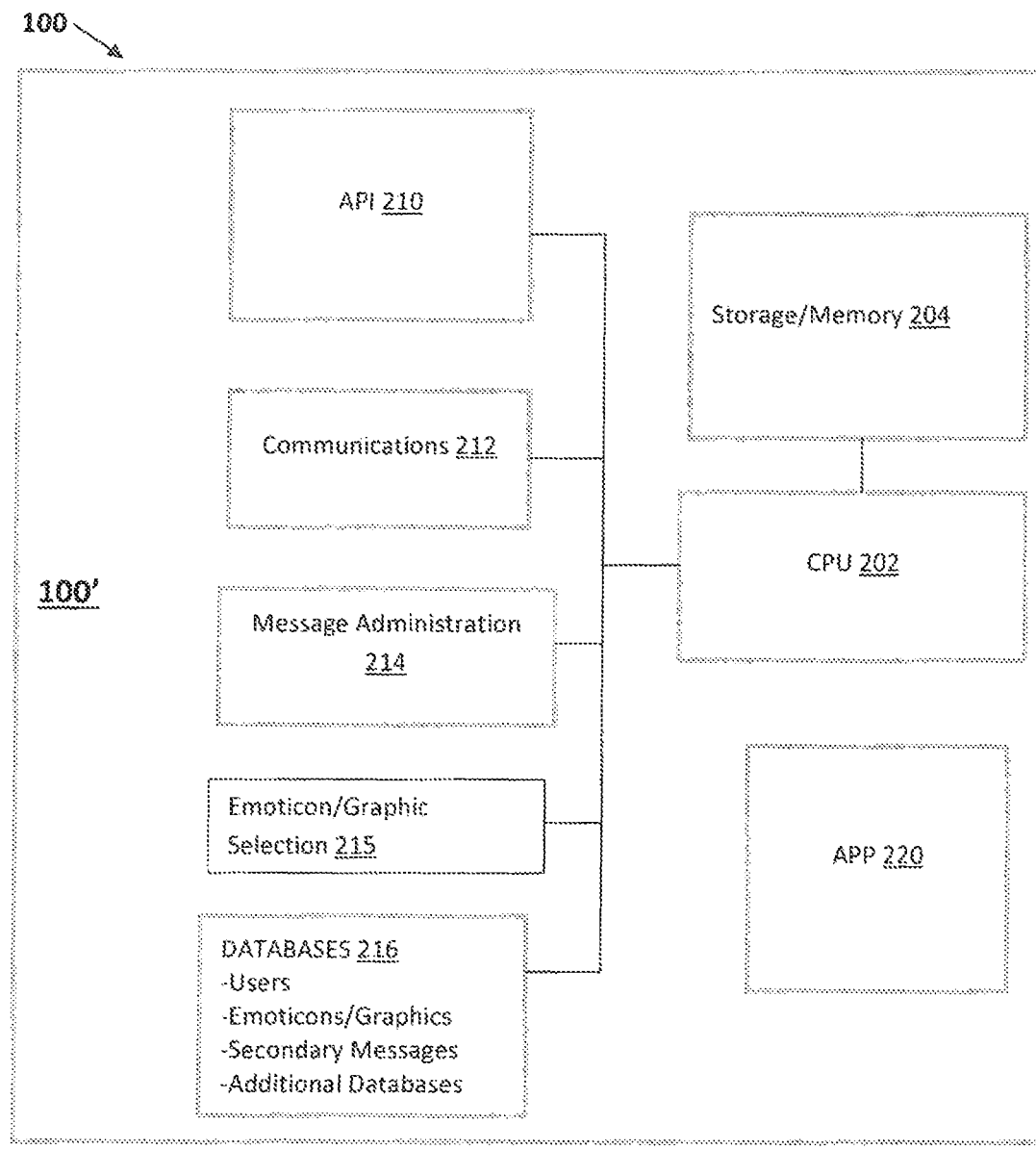
FIG. 2 is a diagram of the architecture of the home server of FIGS. 1A and 1B and the system thereof.

Attention is now directed to FIG. 2, which shows the architecture of the system 100', for example, in the home server 100. This architecture of the system 100', as shown, for example, in the home server 100, includes a central processing unit (CPU) 202 formed of one or more processors, electronically connected, including in electronic and/or data communication with storage/memory 204, storage media 205, an application program interface (API) 210, a communications module 212, message administration module 214, Emoticon/Graphic Selection module (selection module) 215, and databases 216. The application 220 is also stored in the system 100' of the home server 100, and is accessible by users for download (one downloaded the application is represented as element 220', as shown in FIGS. 1B and 8).

The Central Processing Unit (CPU) 202 is formed of one or more processors, including microprocessors, for performing the home server 100 and system 100' functions and operations detailed herein, including controlling the storage media 204, API 210, communications module 212, message administration module 214, selection module 215, and databases 216, along with the processes and subprocesses shown in FIGS. 3A, 3B and 4A-4D, as detailed below. The processors are, for example, conventional processors, such as those used in servers, computers, and other computerized devices. For example, the processors may include x86 Processors from AMD and Intel, Xenon® and Pentium® processors from Intel, as well as any combinations thereof.

The storage/memory 204 is any conventional storage media. The storage/memory 204 stores machine executable instructions for execution by the CPU 202, to perform the processes of the invention. The storage/memory 204 also includes machine executable instructions associated with the operation of the components, including the API 210, communications module 212, message administration module 214, databases 216, and applications 220, and all instructions for executing the processes of FIGS. 3A, 3B and 4A-4D, detailed herein. The storage/memory 204 also, for example, stores rules and policies for the system 100' and the home server 100. The processors of the CPU 202 and the storage/memory 204, although shown as a single component for representative purposes, may be multiple components, and may be outside of the home server 100 and/or the system 100', and linked to the network 50.

The Application Programming Interface (API) module 210 functions to specify how the system 100' requests, retrieves, and may share data from servers and other computers and the like outside of the system 100', including those linked to the network 50. The API module 210 also functions to facilitate the interaction of the various software, components, modules, and databases with each other, and also interactions with other servers and the like outside of the system 100', for operation of the disclosed processes.

The communications module 212 is designed to handle communications over networks 50, such as the Internet, cellular networks and the like. The message administration module 214 handles administration and operation of the messaging processes, including processes for obtaining data files from outside of the system 100', registration of users for the application 220, as well as includes and applies various rules and policies to the messaging processes when necessary.

The selection module 215 applies natural language processing (NLP) and analysis, text analysis, and other analytics-based logic, including user information, e.g., demographic information, location information, and the like, and processes such as tagging, to the message, for example, the primary message, or message corresponding thereto, and, for example, analyzes the message content and/or data associated with the message, including for example, data associated with the sender or recipient of the message, to select emoticons/graphics for the message. It is these selected emoticons/graphics into which messages are packaged during processes where the system 100' selects the emoticon/graphic, for example, automatically. This emoticon/graphic selection by the system 100' occurs, for example, with the processes of FIGS. 4B and 4D, as detailed below.

The databases 216 include numerous databases in one or more storage media. Exemplary databases include those for registered users of the application 220, emoticons/graphics, secondary messages, and additional databases, such as those for data files or their metadata brought into the system 100' when users create messages.

Figure 3A:
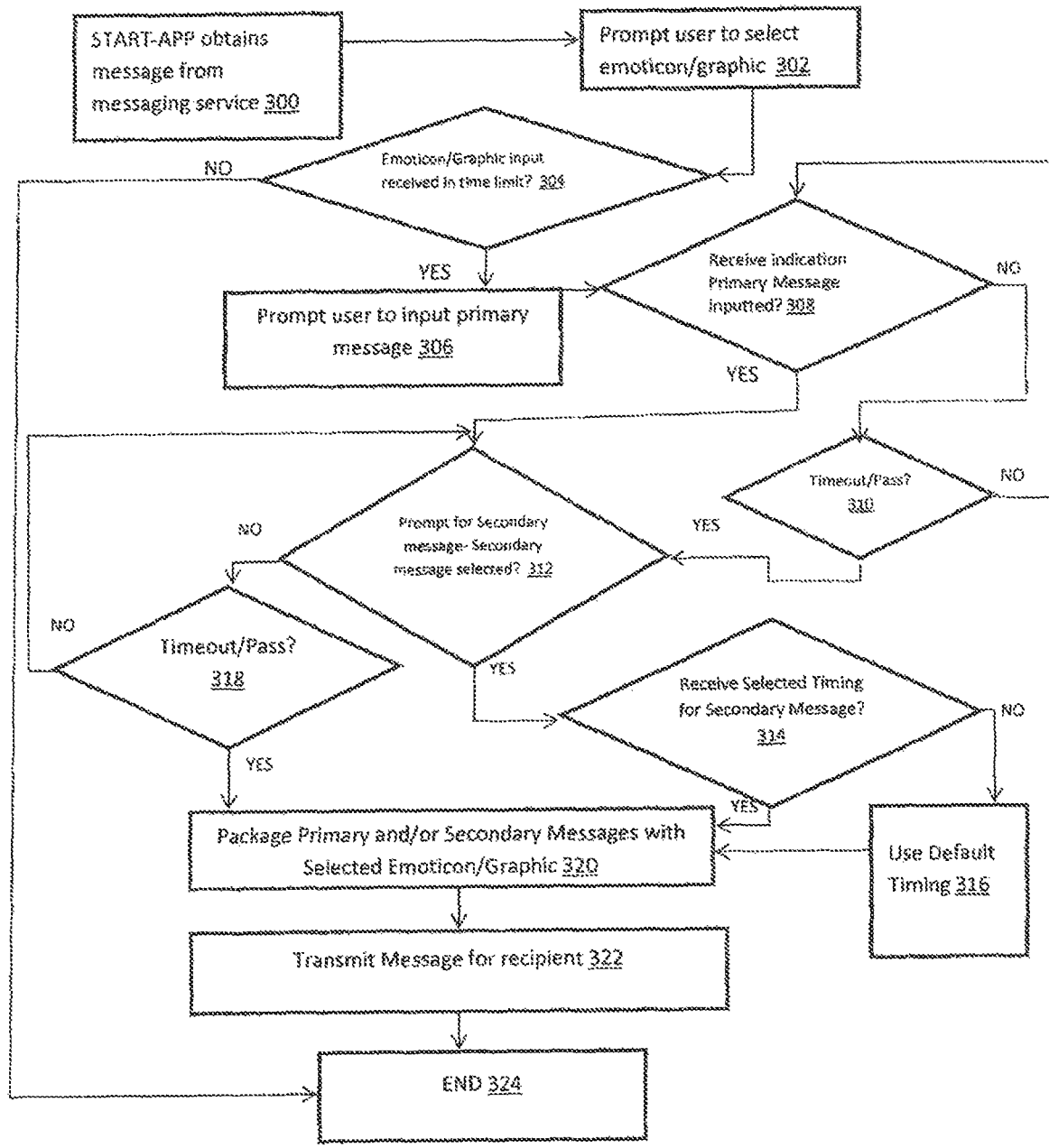
FIG. 3A is a flow diagram of processes in accordance with embodiments of the disclosed subject matter.
Figure 3B:
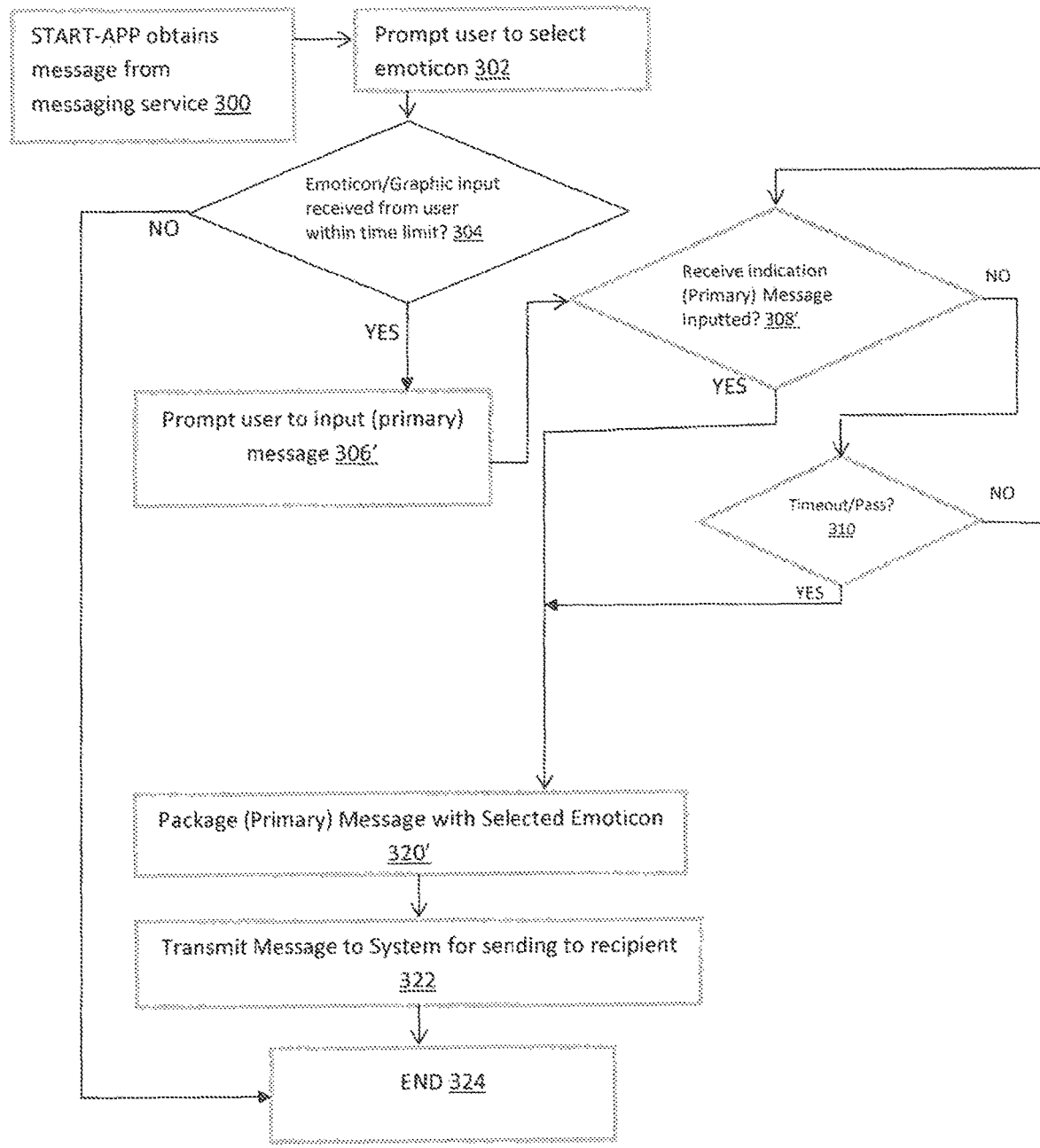
FIG. 3B is a flow diagram of alternative process to the process of FIG. 3A.
Figure 4A:
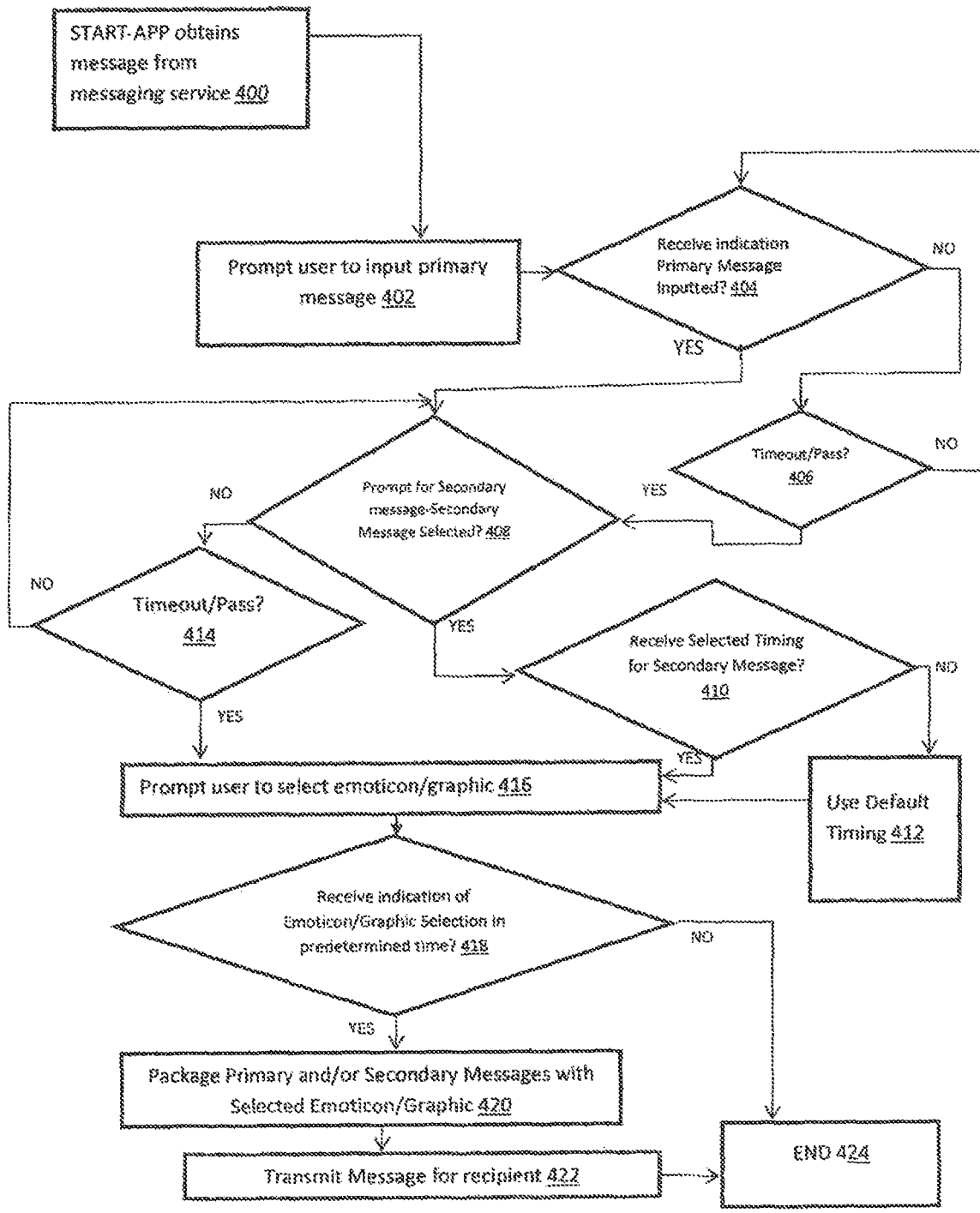
FIG. 4A is a flow diagram of another processes in accordance with embodiments of the disclosed subject matter.
Figures 1, 4B:
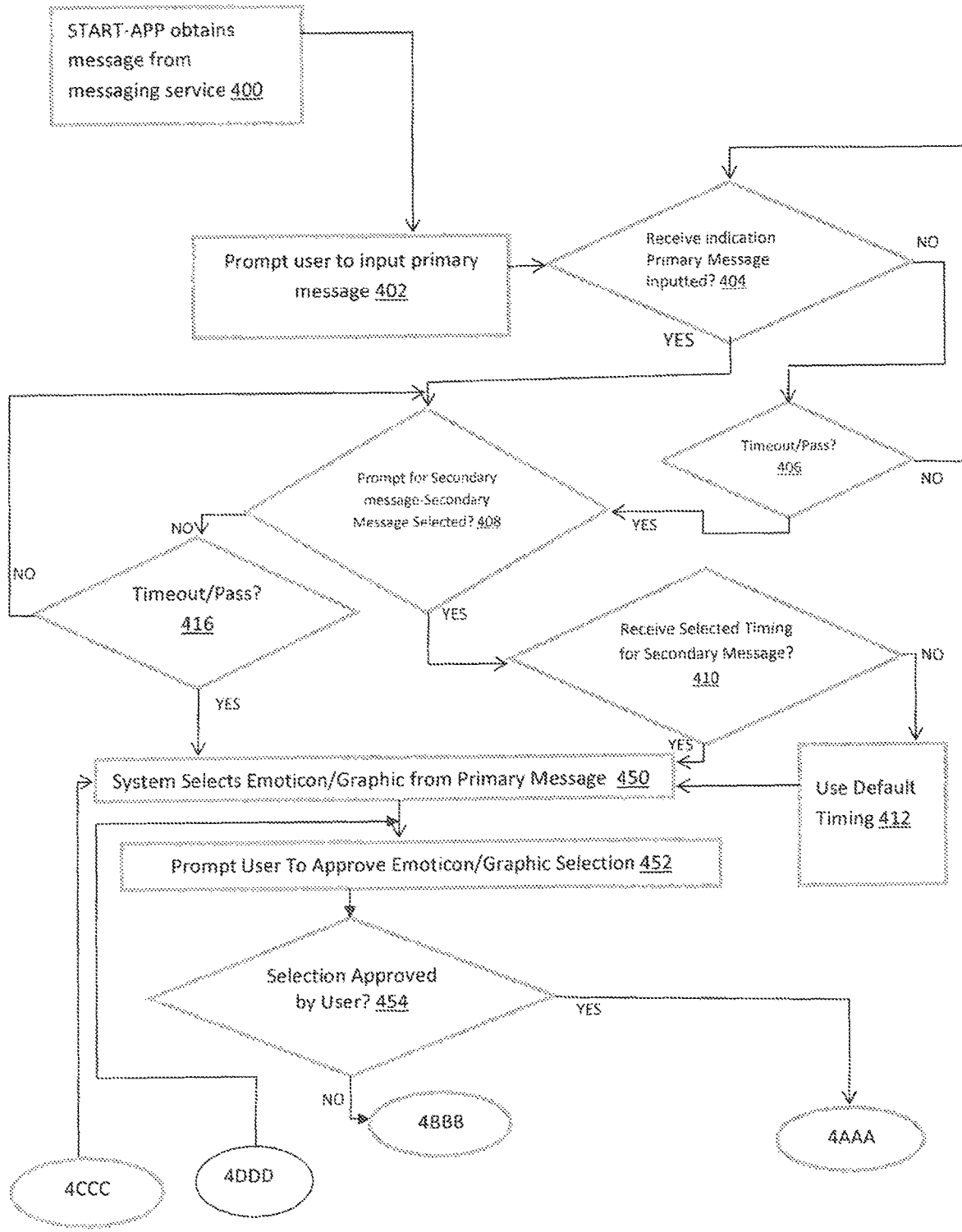
Figures 2, 4B:
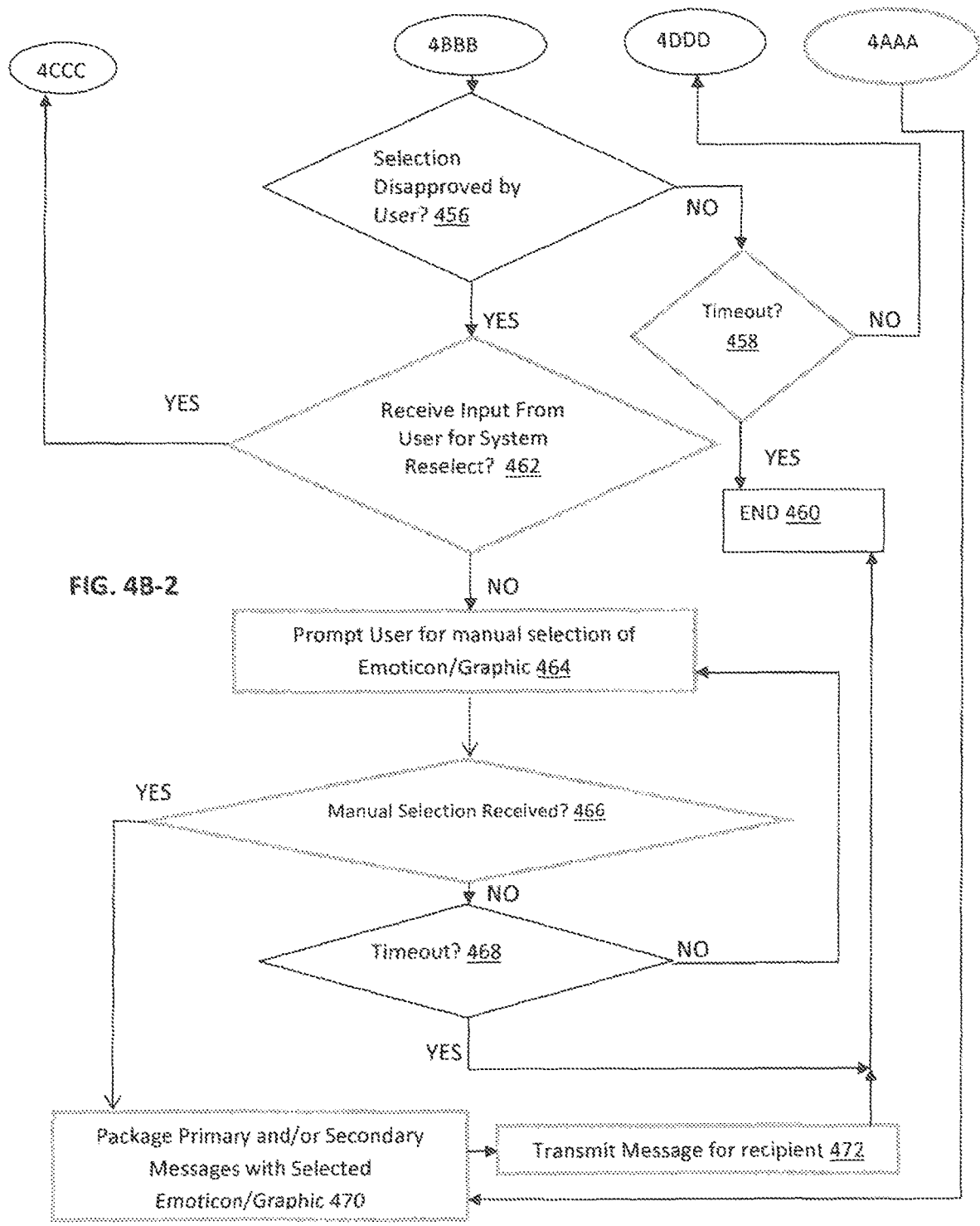
Figures 3, 4B:
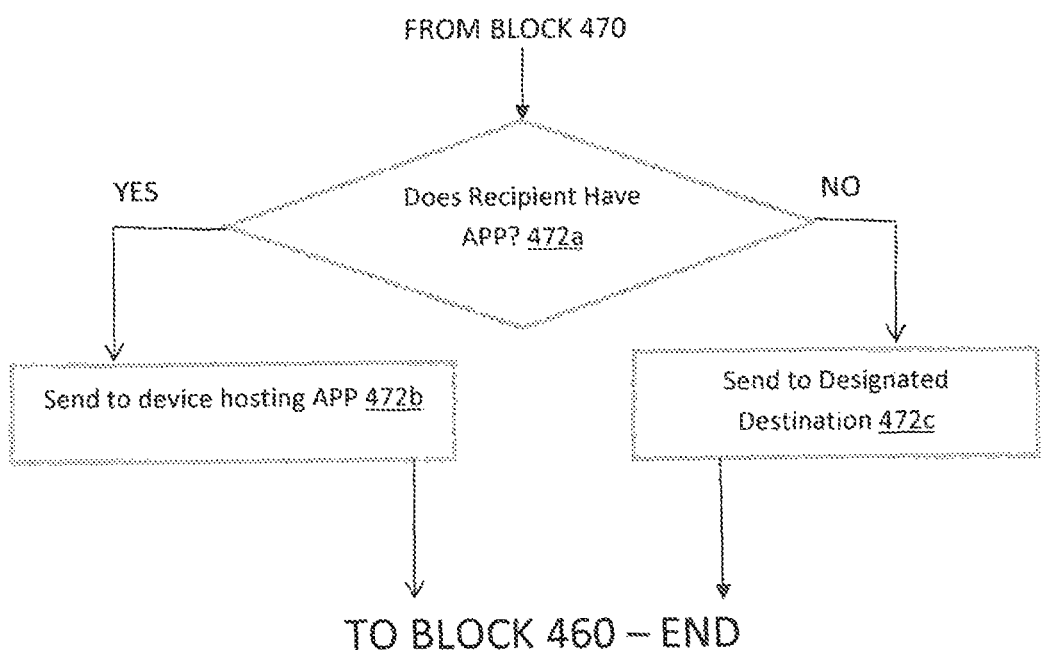
Figure 4C:
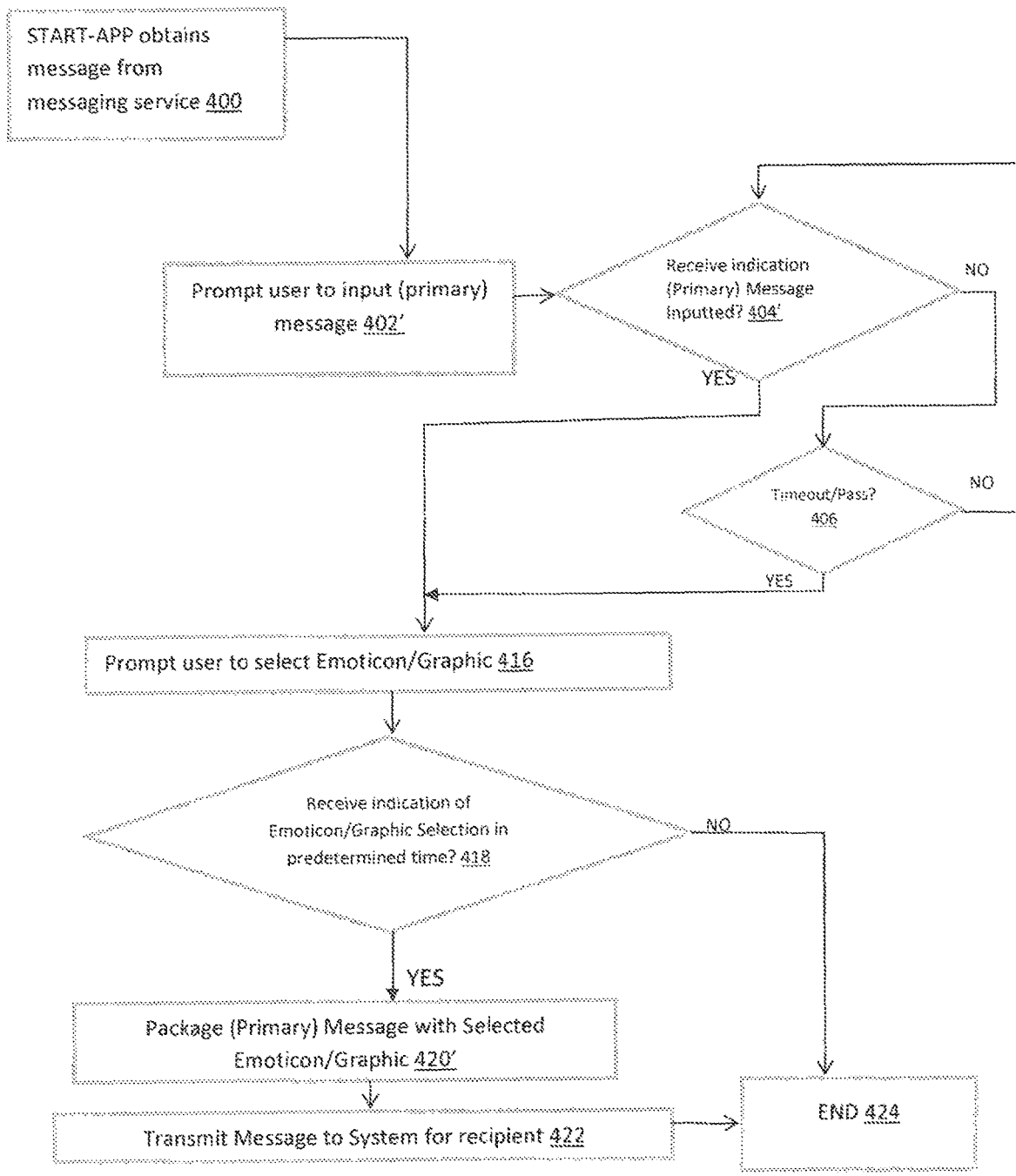
FIG. 4C is a flow diagram of alternative process to the process of FIG. 4A.
Figures 1, 4D:
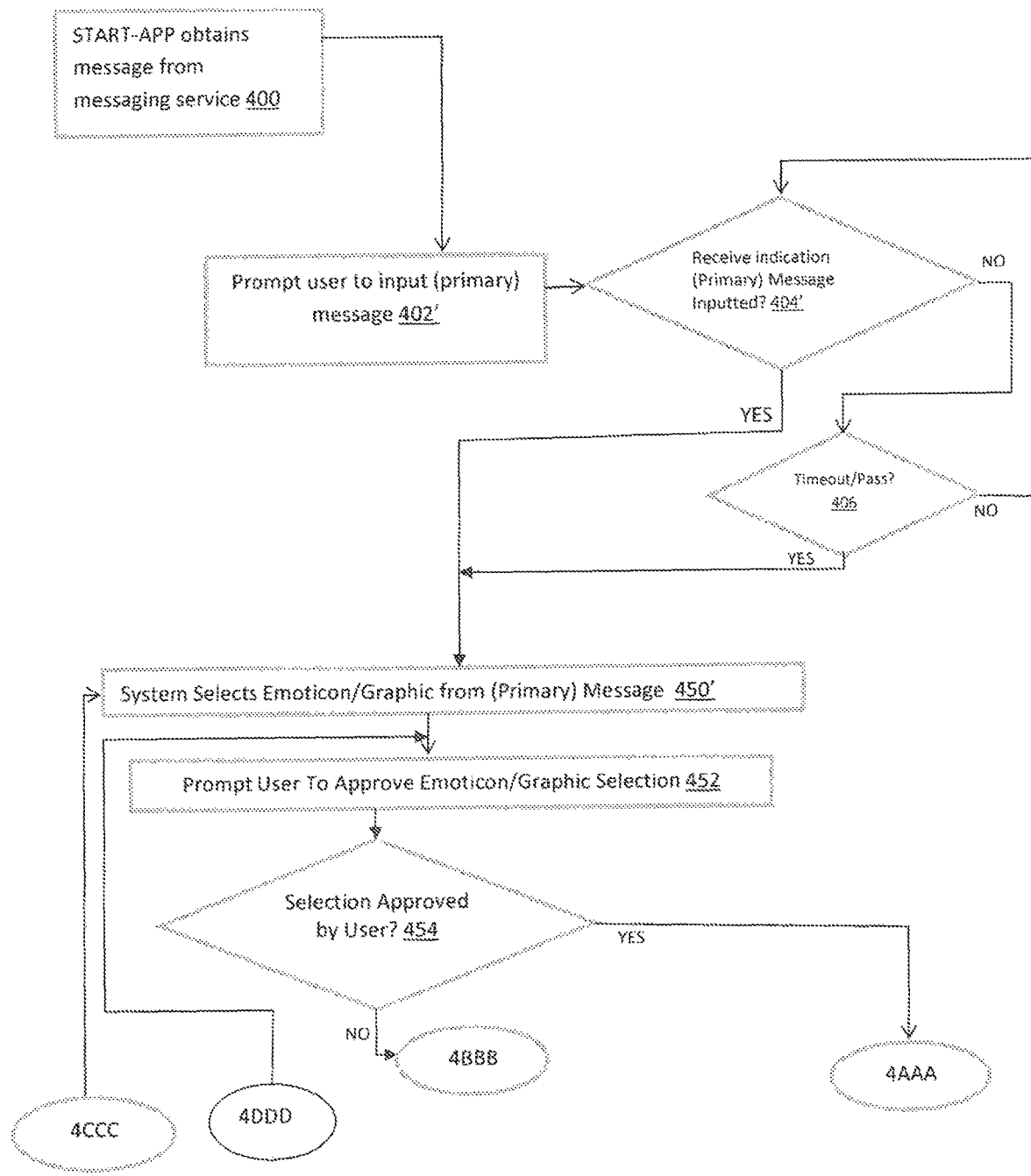
Figures 2, 4D:
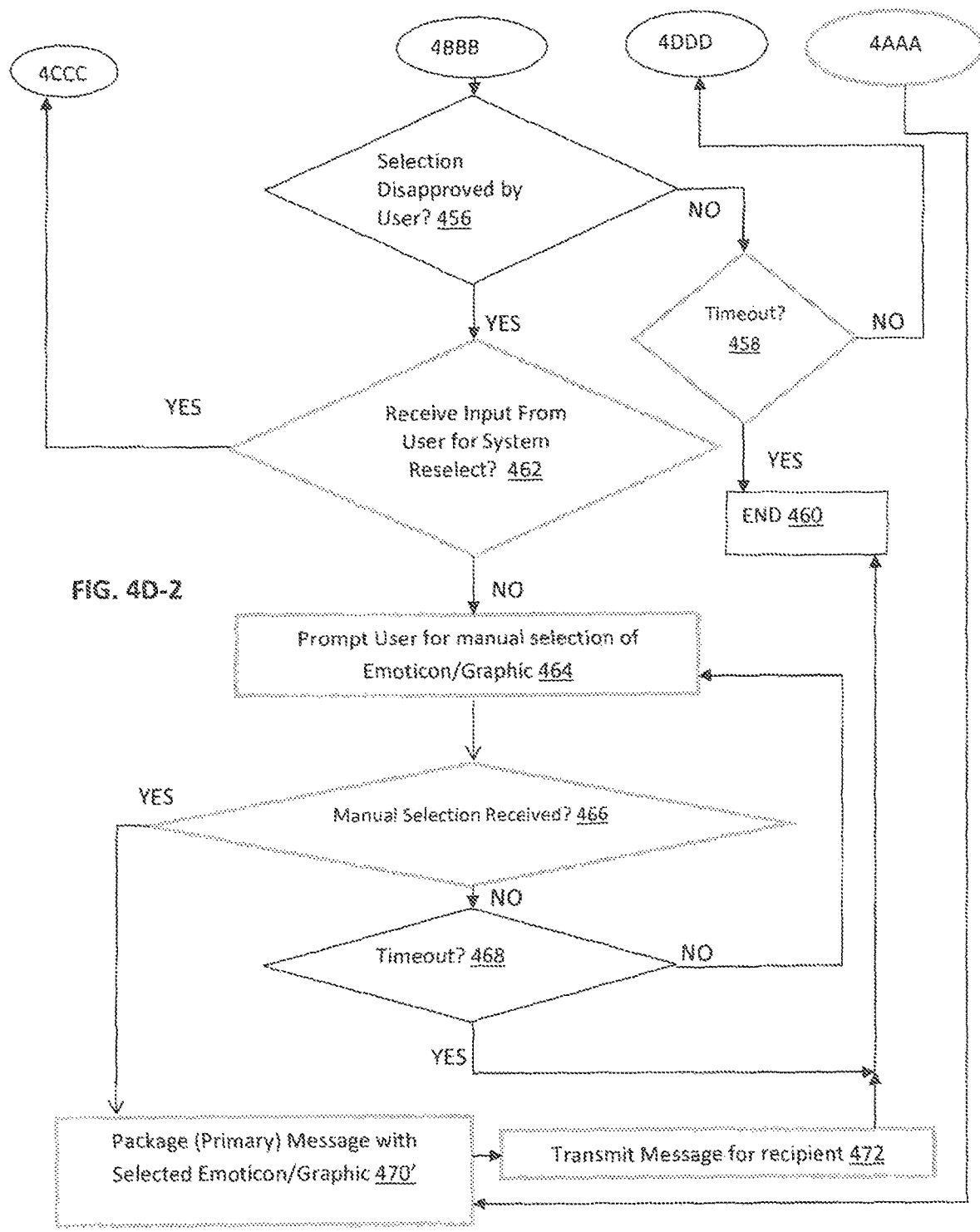
Figures 3, 4D:
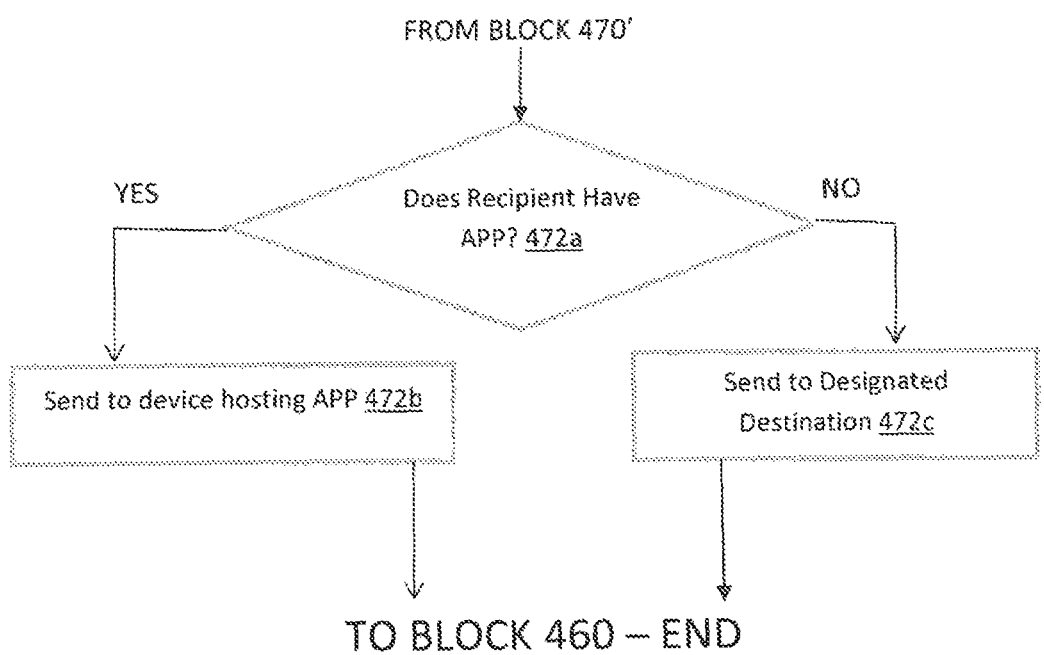

Attention is now directed to FIGS. 3A, 3B, 4A, 4B-1, 4B-2, 4B-3, collectively known as FIG. 4B, 4C, and 4D-1, 4D-2, 4D-3, collectively known as FIG. 4D, which show flow diagrams detailing computer-implemented processes in accordance with embodiments of the disclosed subject matter. Reference is also made to elements shown in FIGS. 1A, 1B and 2. The process and subprocesses of FIGS. 3A, 3B, 4A, 4B, 4C and 4D are computerized processes performed by the system 100' in conjunction with the client, for example, the application 220', deployed on the user computers 120, 130. The aforementioned processes and subprocesses can be, for example, performed manually, automatically, or a combination thereof, and, for example, in real time. Reference is also made to the diagrams and screen shots of FIGS. 5, 6A-6E, and 7, which appear on the monitor, e.g., touchscreen, of the computer, e.g., smartphone 120, 130, of the users 121, 131, when describing the processes of FIGS. 3A, 3B, 4A, 4B, 4C and 4D, as detailed below.

Prior to the START block 300 of the process detailed in FIG. 3A, the application 220 has been installed by the users 121, 131 on their computers 120, 130 (the installed application represented as 220').

The process begins at the START block 300, when the Application 220' is open or otherwise activated (running and executing), a connection or pipe to the home server 100 is opened. Also at the START block 300, the user, for example Sally 121 has activated the requisite messaging function, e.g., text, SMS, MMS, WhatsApp™, Viber™, Twitter™, AOL™ Instant Messenger™ (IM), email, or the like, on her computer 120.

Figure 5:
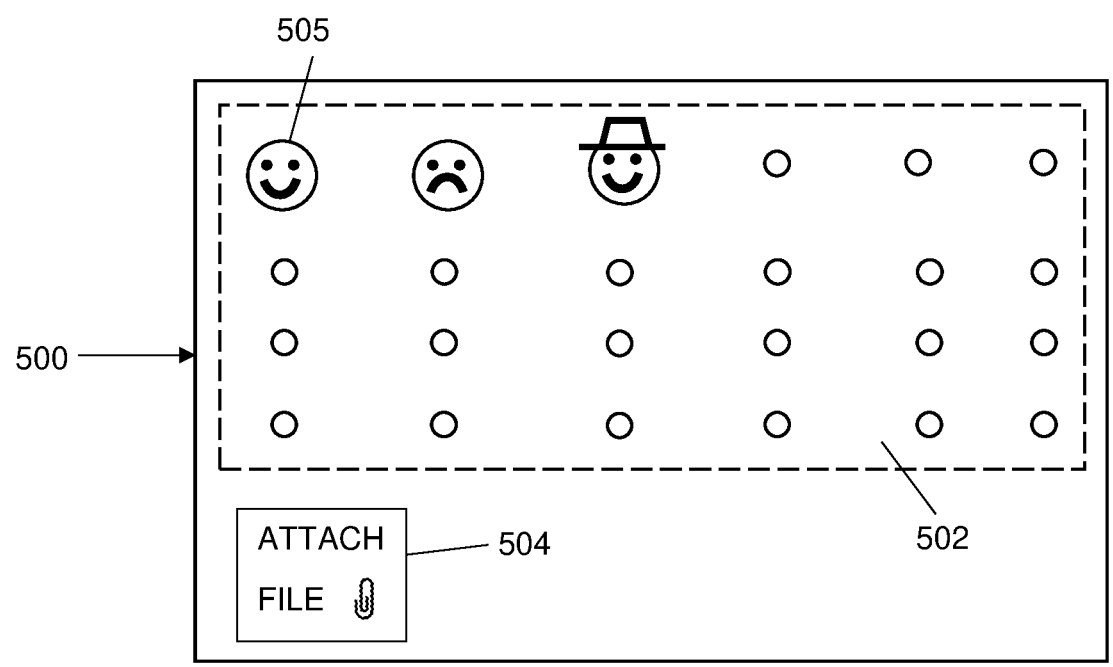
FIG. 5 is a screen shot that appear on the screen of a user's smart phone with emoticon or graphic selections.

The process moves to block 302, where the system 100' prompts the user to select a graphic, for example, one or more emoticons, such as the emoticons shown in the screen display 500 of FIG. 5, in the area 502 shown by the broken line box. Alternatively, instead of an emoticon, a file may be attached by the user, the file of a graphic, such as a drawing, photograph, video (with or without audio), or the like. This file is attached by the user selecting the "Attach File" option in the "Attach File" space 504. For example, sender Sally has elected the emoticon 505.

The system 100', at block 304 receives input of an emoticon or graphic selection from the user (e.g., Sally 121). If this is the case (emoticon 505 has been selected by Sally 121 and this input has been received by the system 100'), the process moves to block 306. However, should such input not be received in a predetermined time, the process moves to block 324, where the process ends.

The computer user, for example Sally 121, who has selected a graphic, e.g., emoticon 505, receives a prompt, at block 306, to input or enter the primary message, by either voice, text, video, graphics, or combinations thereof (and can also be a default or other previously stored message, of voice, text, video, graphics, or combinations thereof). At block 308, it is determined if the primary message has been inputted, by the system 100' receiving a signal that the message recording and or text of the primary message is complete. For example, the primary message "Now let's get pizza" may be input as text by the sender Sally 121 onto her smart phone 120, and the system 100' receives a signal that Sally's entry of this text is complete.

However, should an indication not be received that the primary message is complete, at block 308, it is determined whether there is a timeout, or if the user has indicated to pass on inputting this primary message, at block 310. Should there not be a time out, or a pass signal (from the user, the "pass" signal indicating that the user wants to create a message based on the secondary message, without a primary message), the process returns to block 308. If there is a timeout or a pass signal is received, the process moves to block 312.

Returning to block 308, if the message is complete, as received in a signal from the user, the process moves to block 312.

At block 312, the system 100' prompts the user to select and input an emoticon/graphic and determine if this action has occurred within a predetermined time (e.g., the system 100' receiving an indication of completion). For example, these secondary messages are also presented on a touch screen 600 of a smart phone (e.g., 120, 130) in the form of graphics, as shown, for example as boxes 602a-602f, in FIG. 6A, and are, for example, representative of sounds and or graphics, or combinations thereof, which are either predetermined for selection by the user, or the user may select to record his own secondary message, e.g., the graphic, "Attach File," represented by the box 604 The predetermined sounds are, for example, bodily sounds, such as flatulence (box 602a), burps/belches (box 602b), kisses (box 602c), laughs (box 602d), and the like. A combination of a graphic with a sound is, for example, an exploding birthday cake (box 602e). Another graphic can be a graphic with a graphic, such as a heart that opens with the message, "I Love You," such as that shown in box 602f. The application owner and/or system administrator can add additional sounds, graphics, as detailed above, as desired.

Figure 6A:
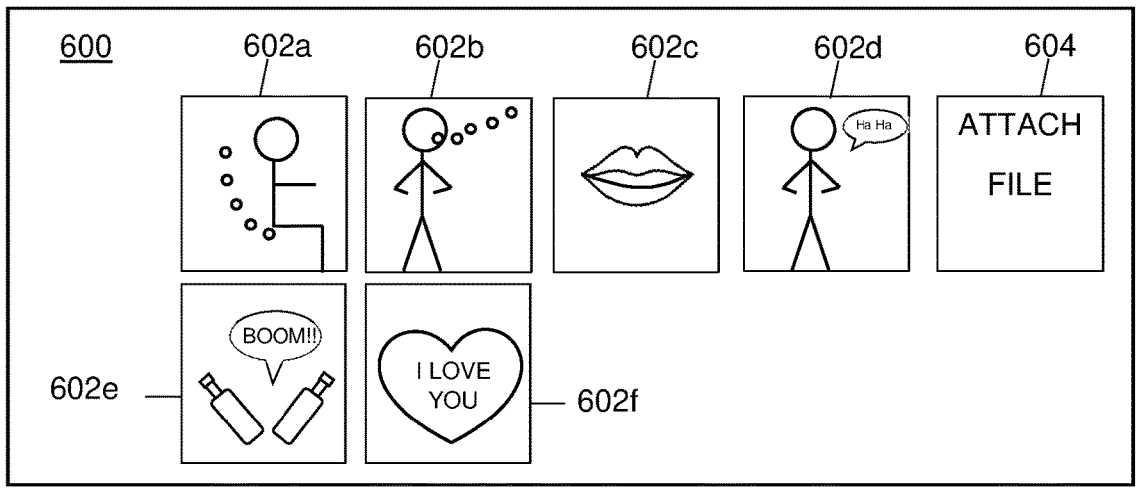
FIGS. 6A-6E are screen shots or screen diagrams that appear on the screen of the user's smart phone associated with secondary message selections.
Figure 6D:
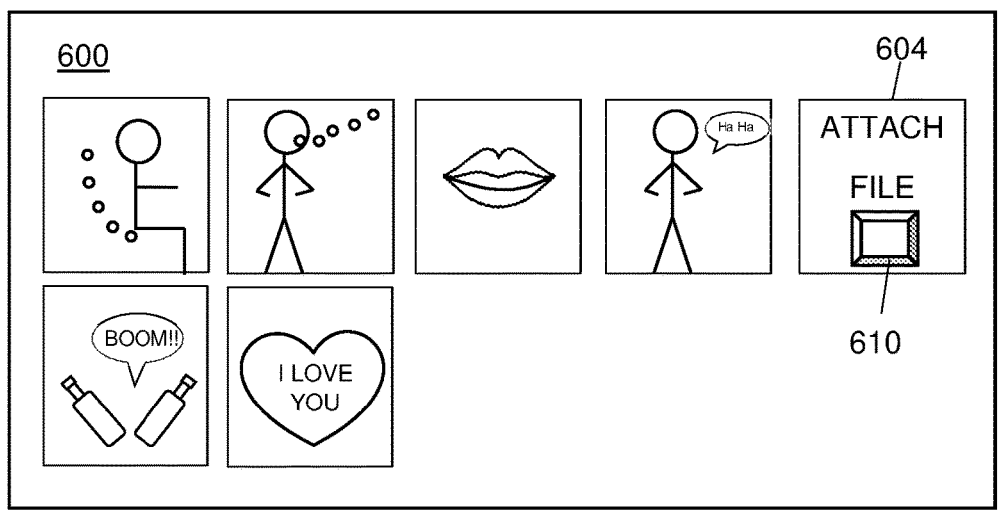
Figure 6E:
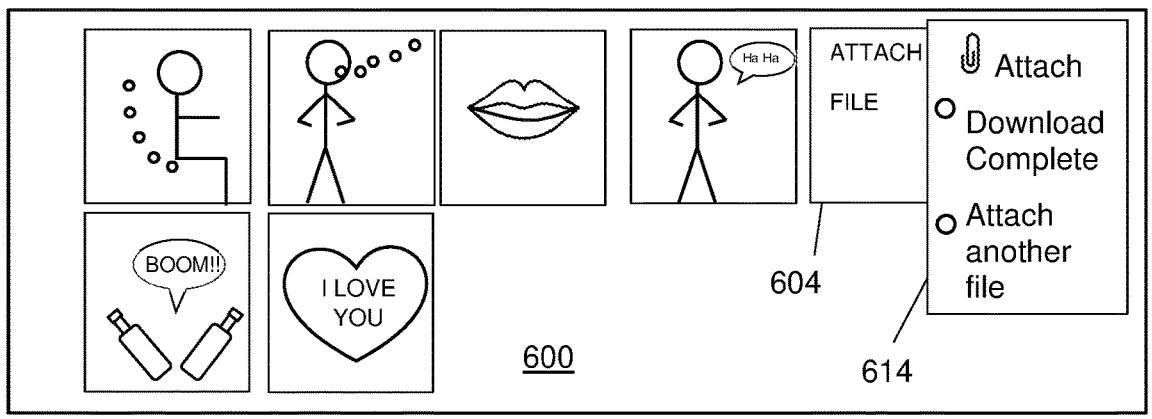
Figure 6B:
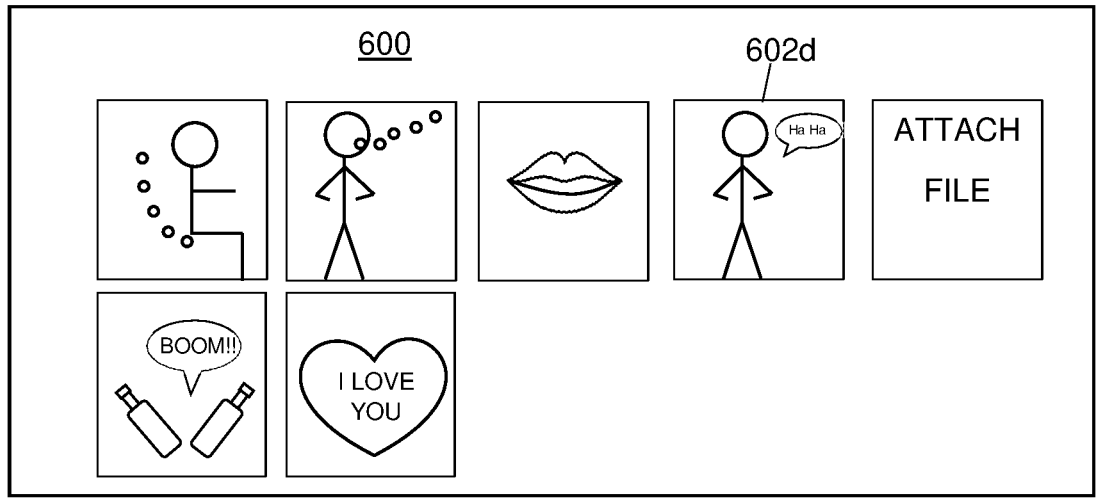
Figure 6C:
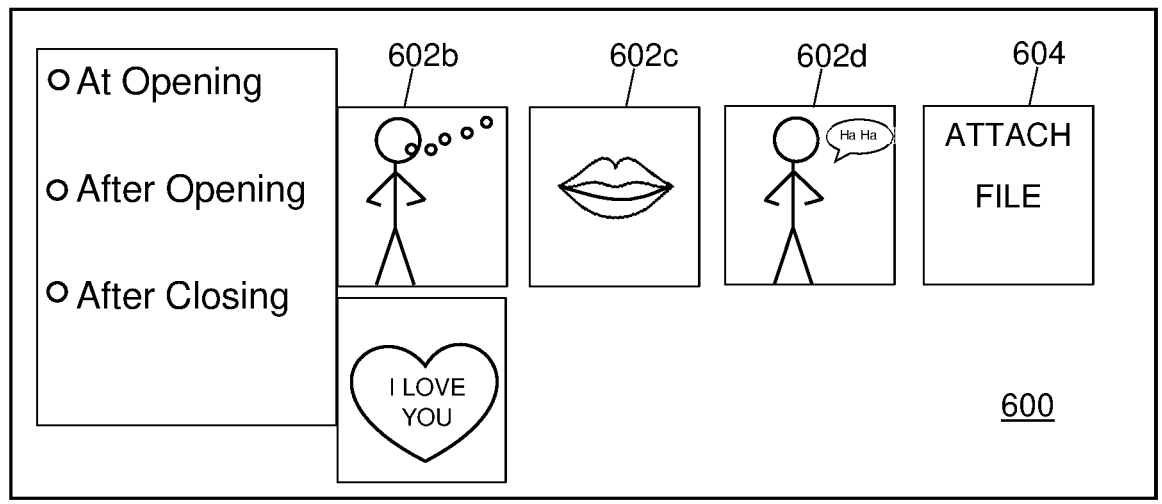
Figure 7:
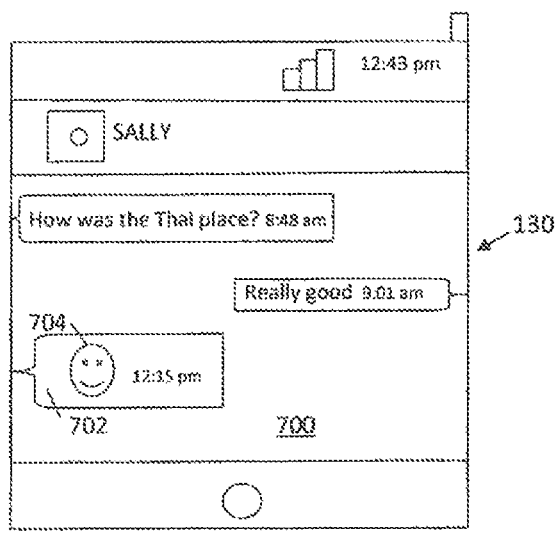
FIG. 7 is a screen diagram of a messaging session in accordance with an embodiment of the invention; and, FIG. 8 is a diagram detailing the communication path of the messaging session, in the example environment of FIG. 1B.

If an indication of completion of the secondary message being inputted has been received (as shown in FIG. 6B, the user has selected a burp/belch, represented by block 602b as the secondary message, as indicated by touch contact 606), the process moves to block 314. At block 314, the system 100' prompts the user to select the timing of this secondary message, with respect to the primary message, by, for example, making a selection, from a pop-up menu 608, as shown in FIG. 6C.

With a signal received by the system 100', at block 314 that the timing for the message has been selected, the process moves to block 320. Should the timing not be selected, the process moves to block 316, where a default is applied. This default is, for example, the menu choice "after closing," but could be any other timing as programmed by the system administrator.

Alternately, at block 312, a secondary message may can be selected by the user her own secondary message, by activating by contact 610 the "Attach File" box 604, as shown in FIG. 6D. The user attaches the desired file, of text, graphics, voice, video, or the like, and indicates that more files are being attached or the downloading of the attachment is complete, via the pop-up menu 614 which has appeared, as shown in FIG. 6E. The process now moves to block 314, from where it resumes.

Returning to block 312, if an indication of completion has not been received, the process moves to block 318, where it is determined if there was a timeout or the user indicated they were passing (initiating a pass signal) on adding a secondary message. If a pass signal has not been detected and there has not been a timeout, the process returns to block 312. Alternately, should a pass signal be received, or there is a timeout, the process moves to block 320.

At block 320, the system 100' or application code, packages the primary and/or secondary message into the selected emoticon or graphic, for sending by the requisite texting or electronic messaging process, e.g., SMS, MMS, WhatsApp™, Viber™, and the like, to the intended recipient. Here, for example, the intended recipient is Robert 131. The system 100', via the communications module 212, transmits the now-complete message to the intended recipient, e.g., Robert 131, at block 322, by the sender's (e.g., Sally 121) messaging service. The process moves to block 324, where it ends.

The message 702 is received, for example, on the touch screen 700 of smart phone 131 of Robert. The message 702 displays as the selected emoticon/graphic, here, for example the emoticon 704 selected by Sally at block 304 of the process on the touch screen 700 of the smartphone 130 of Robert 131. For example, this message is opened or activated by a touch contact on the emoticon 704, and, is for example, the text, "Now let's get pizza"—the primary message, followed by an audible burp/belch (FIG. 6B, block 602b)—the secondary message.

FIG. 3B shows an alternative process to the process of FIG. 3A, where a first message, corresponding to the primary message of the process of FIG. 3A, is packaged with an emoticon or graphic, and transmitted for sending, in a manner similar to that of the process of FIG. 3A. The message for the process of FIG. 3B corresponds to the primary message of FIG. 3A, as it is a message with voice, text, graphics, video, or combinations thereof (and can also be a default or other previously stored message of voice, text, graphics, video or combinations thereof). The process of FIG. 3B differs from the process of FIG. 3A, in that a secondary message is not processed. Accordingly, in FIG. 3B, all blocks with the same numbers are identical to those detailed above in FIG. 3A, and are in accordance with the descriptions above. Blocks 306', 308' and 320' are similar to corresponding blocks 306, 308 and 320 of the process of FIG. 3A, except that the message corresponds to the primary message of the process of FIG. 3A, and the message is the same type of message (e.g., voice, text, graphics, video, or combinations thereof (and can also be a default or other previously stored message of voice, text, graphics, video or combinations thereof)), as the primary message of FIG. 3A.

Attention is now directed to FIG. 4A, which shows another embodiment of a process. Prior to the START block 400 of the process detailed in FIG. 4A, the application 220 has been installed by the users 121, 131 on their computers 120, 130 (the installed application represented as 220').

The process begins at the START block 400, when the Application 220' is open or otherwise activated (running and executing), a connection or pipe to the home server 100 is opened. Also at the START block 400, the user, for example Sally 121 has activated the requisite messaging function, e.g., SMS, Whatsapp™, Viber™, or the like, on her computer 120.

The system 100' prompts the user to input her primary message, at block 402. Similar to that detailed above, the user enters voice, text, graphics, video, or combinations thereof, including any default or stored messages, and once an indication of this primary message being inputted reaches the system 100' at block 404, the process moves to block 408. However, should an indication of such primary message input not be received, at block 404, the process moves to block 406.

At block 406, it is determined if there was a timeout, e.g., the input primary message was not received in a predetermined time, or the user chose to pass on inputting a primary message, the process moves to block 408. Otherwise, the process returns to block 404, from where it resumes.

At block 408, the system 100' prompts the user to select a secondary message and receive an indication of completion (in accordance with block 312 above). If an indication of completion of the secondary message being inputted has been received, the process moves to block 410. At block 410, the system 100' prompts the user to select the timing of this secondary message, with respect to the primary message (in the same manner as described for block 314 above).

With a signal received by the system 100', at block 410 that the timing for the message has been selected, the process moves to block 416. Should the timing not be selected, the process moves to block 412, where a default is applied. This default is, for example, the menu choice "after closing," but could be any other timing as programmed by the system administrator. From block 412, the process moves to block 416.

Returning to block 408, if an indication of completion has not been received, the process moves to block 414, where it is determined if there was a timeout or the user indicated they were passing (initiating a pass signal) on adding a secondary message. If a pass signal has not been detected and there has not been a timeout, the process returns to block 408. Alternately, should a pass signal be received, or there is a timeout, the process moves to block 416.

At block 416, the system 100' prompts the user to select and input an emoticon/graphic. The process moves to block 418, where the system 100' determines if an emoticon/graphic has been received, within a predetermined time. If no, the process moves to block 424, where it ends. If yes, the process moves to block 420.

At block 420, the primary and/or secondary messages are packaged into the selected emoticon/graphic, as detailed for block 320 above. The process moves to block 422, where the system 100', via the communications module 212, transmits the now-complete message to the intended recipient. The process moves to block 424, where it ends.

FIGS. 4B-1, 4B-2 and 4B-3, collectively FIG. 4B, are a flow diagram for an alternate process to that of FIG. 4A. This process includes similar portions to the process of FIG. 4A, but the system 100' itself may be used to select the emoticon/graphic, in which the message(s) is/are packaged. The initial part of the process, blocks 400, 402, 404, 406 the same as in the process of FIG. 4A, and are in accordance with the descriptions for the process of FIG. 4A above.

From blocks 404 and 406, the process moves to block 450. At block 450, the system 100', e.g., the selection module 215, selects an emoticon/graphic, for example, for the primary message (e.g., in which the primary message alone, or with the secondary message is packaged, for transmission to a recipient). The selection module 215 analyzes the primary message, by one or more computerized analytical techniques, such as those detailed above, and based on the analysis, selects, e.g., automatically, an emoticon/graphic for the primary message. In this selected emoticon/graphic, messages are packaged, for transmissions from senders to recipients in electronic communications, including electronic messages, over the network(s) 50.

The process then moves to block 452, where the user is prompted (by the system 100') to approve the selected emoticon/graphic. Moving to block 454, it is determined whether the selected emoticon/graphic was approved by the user. If yes, the process moves to block 470. If no, the process moves to block 456.

At block 456 it is determined whether the user disapproved the selection of the emoticon/graphic, made by the system. If no, at block 456, the process moves to block 458, where it is determined whether there is a system timeout, at block 458. If the system timed out at block 458, the process movers to block 460, where it ends. If there was not a system timeout at block 458, the process returns to block 452, from where it resumes, as detailed above.

Returning to block 456, if yes, the process moves to block 462, where it is determined whether the system 100' received input from the user for a reselection of the emoticon/graphic. If yes, at block 462, the process returns to block 450, from where it resumes, as detailed above. If no at block 462, the process moves to block 464, where the system 100' prompts the user to select, e.g., manually, an emoticon graphic, including a stored or default emoticon or graphic.

The process moves to block 466, where it is determined (by the system 100') whether a manual selection of an emoticon/graphic, has been received by the system 100'. If yes, the process moves to block 470. If no, the process moves to block 468, where it is determined whether there is a system timeout. If the system timed out at block 468, the process movers to block 460, where it ends. If there was not a system timeout at block 468, the process returns to block 464, from where it resumes, as detailed above.

With the process continuing from block 470, the primary message and/or the secondary message, is packaged with the selected emoticon/graphic. This packaging is for the message(s) to be transmitted to the recipient over the network(s) 50. The process then moves to block 472, where the message(s), as packaged in the emoticon/graphic are transmitted from the sender, e.g., client, device, e.g. 120, to the recipient's 131 (device 130 or other destination), either through the system 100', or via other servers (including, for example, those of the cellular carriers 150, 151) along the network(s) 50, or other direct or indirect route to the recipient, over the network(s) 50. Once the transmission from the system 100' is made, the process moves to block 460, where it ends.

Returning to block 472, and to FIG. 4B-3, an exemplary subprocess for the transmission of block 472 is shown. From block 470, the process moves to block 472a, where the system determines whether the recipient, e.g., the intended recipient, of the message(s), has the application 220, installed, and typically running on his device, e.g., recipient 131 running the APP 220' on his device 130, as shown, for example, in FIG. 1B. If yes, the process moves to block 472*b*, where the system 100' transmits the message such that its destination is the device of the intended recipient, which hoists the application (APP), for example, device 131 hosting the APP 220'. If no, the process moves to block 472*c*, where the system 100' transmits the message, such that it is to be sent to a designated destination, such as a web site/web page, where it can be accessed by the intended recipient. For example, this may be the web site 162, www.messages.com, hosted by the server 160. The intended recipient, e.g., recipient Robert 131, can access the message here. Also, for example, the web site 162 can be such that the user (sender), e.g., sender Sally 121, can access the message as well. From both blocks 472*b* and 472*c*, the process moves to block 460, where it ends.

FIG. 4C shows an alternative process to the process of FIG. 4A, where a first message, corresponding to the primary message of the process of FIG. 4A, is packaged with an emoticon or graphic, and transmitted for sending, in a manner similar to that of the process of FIG. 4A. The message for the process of FIG. 4C corresponds to the primary message of FIG. 4A, as it is a message with voice, text or both (and can also be a default or other previously stored message of voice, text, graphics video, or combinations thereof). The process of FIG. 4C differs from the process of FIG. 4A, in that a secondary message is not processed. Accordingly, in FIG. 4C, all blocks with the same numbers are identical to those detailed above in FIG. 4A, and are in accordance with the descriptions above. Blocks 402', 404' and 420' are similar to corresponding blocks 402, 404 and 420 of the process of FIG. 4A, except that the message corresponds to the primary message of the process of FIG. 4A, and the message is the same type of message (e.g., voice, text, graphics, video, or combinations thereof (and can also be a default or other previously stored message of voice, text, graphics, video or combinations thereof)), as the primary message of FIG. 4A.

FIG. 4D (FIGS. 4D-1, 4D-2, 4D-3) shows an alternative process to the process of FIG. 4B (FIGS. 4B-1, 4B-2, 4B-3), where a first message, corresponding to the primary message of the process of FIG. 4B, is packaged with an emoticon or graphic, and transmitted for sending, in a manner similar to that of the process of FIG. 4B. The message for the process of FIG. 4D corresponds to the primary message of FIG. 4B, as it is a message with voice, text or both (and can also be a default or other previously stored message of voice, text, graphics, video, or combinations thereof). The process of FIG. 4D differs from the process of FIG. 4B, in that a secondary message is not processed. Accordingly, in FIG. 4D, all blocks with the same numbers are identical to those detailed above in FIG. 4B, and are in accordance with the descriptions above. Blocks 402', 404', 450' and 470' are similar to corresponding blocks 402, 404, 450, 470 of the process of FIG. 4B, except that the message corresponds to the primary message of the process of FIG. 4B, and the message is the same type of message (e.g., voice, text, graphics, video, or combinations thereof (and can also be a default or other previously stored message of voice, text, graphics, video or combinations thereof)), as the primary message of FIG. 4B.

In all of the above-described processes of FIGS. 3A, 3B, 4A, 4B, 4C and 4D, the emoticons/graphics with the packaged message(s), are, for example, packaged or placed in, or otherwise form, electronic communications, including electronic messages. These electronic communications are for transmission from the sender, via the sending computerized device (e.g., smart phone, such as smart phone 120 of FIGS. 1A, 1B and 8, tablet computer, iPad®), computer or the like, to a network destination for the recipient, such as a computerized device (e.g., smart phone, such as smart phone 130 of FIGS. 1A, 1B and 8, tablet computer, iPad®), computer, web site or the like, over a communications network, such as the network(s) 50. Such electronic communications, including electronic messages, can be, for example, e-mails, texts, SMS (short message service) messages, MMS (multimedia messaging service) messages, WhatsApp™ messages, Instant Messenger (IM) messages, including those of ICQ™, Twitter™ messages (commonly known as tweets), and the like. Additionally, while a single emoticon/graphic has been described, multiple emoticons/graphics and combinations of emoticons and graphics may are also permissible, in the electronic communication, in the processes and their descriptions above.

Turning to FIG. 8, there is shown an example, pathway over which the message is transmitted. Here, sender Sally 121, via her smart phone 120, is sending a message to recipient Robert 131, who receives the message 702 on his smart phone 131 display screen 700, as an emoticon 704, which was selected by Sally 121.

Arrow 802 shows Sally's smart phone 120, with the application 220' running on her smart phone 120 (the same holds true for the smart phone 130 of Robert 131, the recipient), contacting her cellular network (via cell tower 140). From the cell tower 140, Sally's communication is sent to the cellular carrier server 150 of Sally 121 (either directly or over the network 50), as shown by arrow 804, and then to the home server 100 and the system 100', over the network 50, as shown by the arrow 806.

The system 100' of the home server 100 processes the communication for Sally so she can create the message for Robert 131, in accordance with the processes of FIGS. 3A and 3B, or 4A-4D, as detailed above. The now-complete message is transmitted from the system 100' of the home server 100 (blocks 322 and 422 of FIGS. 3A and 3B, or 4A-4D, respectively) over the network 50, to the cellular carrier server 151 of Robert, as shown by the arrow 808. The cellular carrier server 151, either directly or indirectly sends the message to the cell tower 141 serving Robert 131, as indicated by the arrow 810, which in turn, provides for the transmission of the message to the smart phone 130 of Robert 131, as indicated by the arrow 812.

The implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A computerized method for electronic messaging over a communications network, comprising:
   obtaining at least one message in electronic form;
   obtaining a graphic in electronic form;
   packaging the at least one message into the graphic for transmission of the at least one message and the graphic together in an end to end electronic communication, from an origin of the end to end electronic communication, from where the end to end electronic communication is transmitted, to a destination of the end to end electronic communication, where the graphic and the at least one message are received, over the communications network, such that when the end to end electronic communication has been received at the destination of the end to end electronic communication, and when the graphic is activated at the destination, the activation includes locally retrieving the at least one message of the graphic, and presenting the at least one message; and
   programming the graphic, such that upon its transmission in the electronic communication, and arrival at the destination of the end to end communication, the graphic presents as a visual representation of the electronic communication transmitted.

2. The computerized method of claim 1, additionally comprising, transmitting the end to end electronic communication to the destination over the communications network.

3. The computerized method of claim 2, wherein the destination includes at least one of: a computerized device, and, a computer along the communications network.

4. The computerized method of claim 1, wherein the at least one message is selected from the group consisting of voice, sound, text, graphics, video, and combinations thereof.

5. The computerized method of claim 1, wherein the at least one message includes:
   a primary message selected from the group consisting of voice, sound, text, graphics, video, and combinations thereof; and,
   a secondary message.

6. The computerized method of claim 5, wherein the secondary message includes audible sounds.

7. The computerized method of claim 1, wherein the graphic includes at least one emoticon.

8. The computerized method of claim 7, wherein the graphic is obtained in response to a selection from a user associated with the sending of the at least one message.

9. The computerized method of claim 7, wherein the graphic is obtained in response to a computer selection of the graphic.

10. The computerized method of claim 9, wherein the computer selection of the graphic is based on at least one of: the content of the message, data associated with a sender of the electronic message, and, data associated with a recipient of the electronic message.

11. The computerized method of claim 1, wherein the at least one message is presented as at least one of: a visible display, a graphic, sound, and video.

12. The computerized method of claim 1, wherein the obtaining the at least one message in electronic form, the obtaining the graphic in electronic form; and, the packaging the at least one message with the graphic for transmission in an end to end electronic communication to the destination over the communications network, are performed by a processor.

13. The computerized method of claim 1, wherein the end to end electronic communication is selected from the group consisting of: e-mails, texts, SMS (short message service) messages, MMS (multimedia messaging service) messages, WhatsApp™ messages, Instant Messenger (IM) messages, and Twitter™ messages.

14. The computerized method of claim 1, wherein the graphic is additionally programmed such that when activated at the destination of the end to end communication, the at least one message is retrieved locally from the graphic and presented.

15. A computerized system for electronic messaging over a communications network, comprising:
   a storage medium for storing computer components;
   a computerized processor for executing the computer components comprising:
      a first computer module for obtaining at least one message in electronic form;
      a second computer module for obtaining a graphic in electronic form; and,
      a third computer module for: 1) packaging the at least one message into the graphic for transmission of the at least one message and the graphic together in an end to end electronic communication, from an origin of the end to end electronic communication, from where the end to end electronic communication is transmitted, to a destination of the end to end electronic communication, where the graphic and the at least one message is received, over the communications network, such that when the end to end electronic communication has been received at the destination of the end to end electronic communication, and the graphic is activated at the destination, the activation includes locally retrieving the at least one message, and the at least one message is presented, and 2) programming the graphic, such that upon its transmission in the electronic communication, and arrival at the destination, the graphic presents as a visual representation of the electronic communication transmitted.

16. The computerized system of claim 15, wherein the second computer module for obtaining the graphic is configured for obtaining the graphic including at least one emoticon.

17. The computerized system of claim 16, wherein the second computer module is additionally configured for receiving the graphic as input, in response to being selected by a user associated with a sender of the at least one message.

18. The computerized system of claim 16, wherein the second computer module is additionally configured for selecting the graphic.

19. The computerized system of claim 16, additionally comprising:
- a fourth computer module for transmitting the end to end electronic communication including the graphic and the at least one message from a computerized device associated with a sender of the end to end electronic communication, together to a computerized destination, associated with a recipient of the end to end electronic communication, over the communications network.

20. A computer usable non-transitory storage medium having a computer program embodied thereon for causing a suitably programmed system to create and prepare for transmission electronic communications, over a communications network, by performing the following steps when such program is executed on the system, the steps comprising:
- obtaining at least one message in electronic form;
- obtaining a graphic in electronic form;
- packaging the at least one message into the graphic for transmission of the at least one message and the graphic together in an end to end electronic communication, from an origin of the end to end electronic communication, from where the end to end electronic communication is transmitted, to a destination of the end to end electronic communication, where the graphic and the at least one message is received, over the communications network, such that when the end to end electronic communication has been received at the destination of the end to end electronic communication, and the graphic is activated at the destination, the activation includes locally retrieving the at least one message, and the at least one message is presented; and
- programming the graphic, such that upon its transmission in the electronic communication, and arrival at the destination, the graphic presents as a visual representation of the electronic communication transmitted.

21. The computer usable non-transitory storage medium of claim 20, wherein the step of obtaining the graphic includes obtaining at least one emoticon in electronic form.

22. The computer usable non-transitory storage medium of claim 21, wherein the step of obtaining the graphic includes receiving the graphic, as input in response to the graphic being selected by a user associated with a sender of the end to end electronic communication.

23. The computer usable non-transitory storage medium of claim 21, wherein the step of obtaining the graphic includes receiving the graphic as selected by a computerized process.

24. The computer usable non-transitory storage medium of claim 23, wherein the selection of the graphic of the computerized process is performed based on at least one of: the content of the at least one message, data associated with a sender of the end to end electronic communication, and, data associated with a recipient of the end to end electronic communication.

25. The computer usable non-transitory storage medium of claim 21, additionally comprising, performing the step of:
- transmitting the end to end electronic communication including the graphic and the at least one message from a computerized device associated with a sender of the end to end electronic communication, to a computerized device, associated with a recipient of the end to end electronic communication, over the communications network.

26. The computer usable non-transitory storage medium of claim 20, additionally comprising, performing the step of:
- transmitting the electronic end to end communication including the graphic and the at least one message from a computerized device associated with a sender of the electronic communication, together to a computerized destination, associated with a recipient of the end to end electronic communication, over the communications network.

* * * * *